Patented Nov. 24, 1931

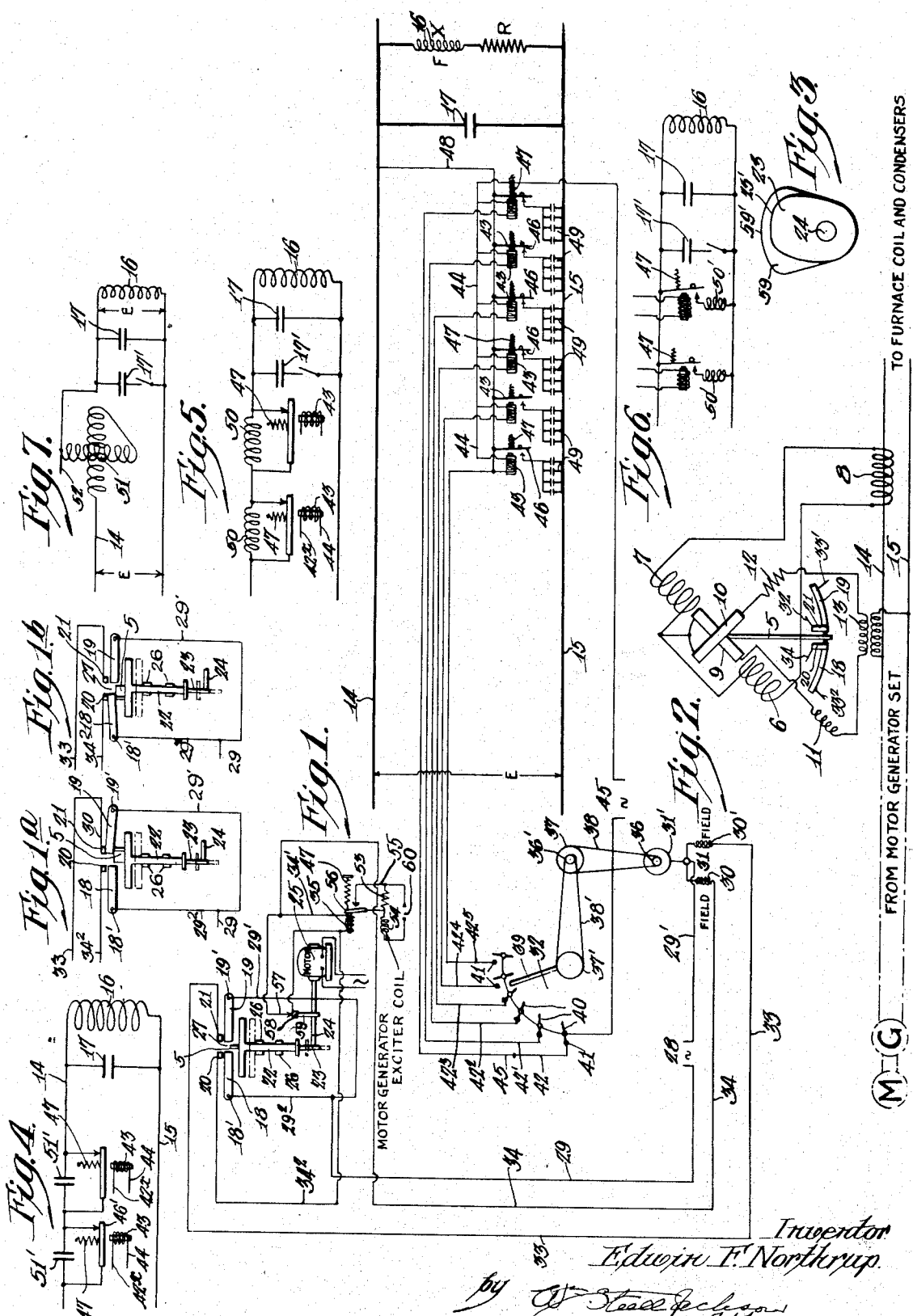

1,833,617

UNITED STATES PATENT OFFICE

EDWIN FITCH NORTHRUP, OF NEAR PRINCETON, NEW JERSEY, ASSIGNOR TO AJAX ELECTROTHERMIC CORPORATION, OF AJAX PARK, NEAR TRENTON, NEW JERSEY, A CORPORATION OF NEW JERSEY

APPARATUS FOR CORRECTING POWER FACTORS

Application filed February 25, 1927. Serial No. 170,782.

My invention relates primarily to methods and apparatus for operating induction electric furnace upon frequency higher than normal having capacity power factor correction for the reactance of the inductor coil. The invention does not require the use of transformer iron.

In the operation of such a furnace the reactance of the furnace coil alters with changes in the characteristics of the load. With non-magnetic charges variation takes place because of differences in the amount and distribution of current in the charge due to temperature rise and, in the melting of scrap, for example, due to changes in contacts and in coupling during the melting operation. With magnetic charges comprising magnetizable metal or magnetizable alloy, such for example as steel or nickel or their alloys, in addition to variations due to these causes there are very large changes in the permeabilities of the charges with corresponding alterations in the reactances of the furnace coils.

Complete power factor correction at the generator is desirable but is not practicable. However, it can be secured within any predetermined limit of variation.

All changes in the reactances of the coils beyond a limit of variation predetermined in the design or policy of operation of the furnace require corresponding changes in the corrective capacity in order to bring the power factor of the circuit within such reasonable limits as will keep the wattless current through the generator down.

Prior to my present invention it was necessary either to ignore the successive changes in reactance with its incidental large wattless current, or to compensate for the changes by hand-changed capacity inserted or withdrawn by an attendant who watched the power factor of the circuit and who corrected it to as near unity as permitted. Any correction made must wait until the variation of the power factor from unity has been noticed by the attendant. This hand adjustment is expensive and is also subject to the weakness inherent to reliance upon observation, at times permitting comparatively large variation from unity power factor before the variation has been noticed and corrected. As a result of this it has been necessary to provide a generator capable of taking care of the maximum wattless current flowing in the circuit during these variations in addition to the in-phase current.

My invention consists primarily in methods and apparatus by which variation of the power factor of a high frequency circuit from unity either way immediately and automatically inserts or removes capacity from a circuit as may be needed, making variation of phase between the current and the electromotive force at the generator supplying the circuit self-corrective.

A further purpose is to combine a device responsive to difference in phase between current and electromotive force adapted to include or exclude condenser units in or from the circuit to which the device responds.

A further purpose is to utilize differences of phase between current and electromotive force in a furnace circuit to progressively, step by step introduce or withdraw successive corrective units into or from the circuit so long as the phase difference persists.

A further purpose is to automatically maintain the voltage to meet the changed conditions in the furnace circuit when the charge loses its magnetic properties.

A further purpose of my invention is to utilize phase-responsive mechanism to put into effect phase-corrective devices in a furnace circuit.

A further purpose is to supply a furnace circuit with a minimum corrective capacity and with sufficient automatically inserted additional capacity to supply maximum needs, and as the reactance of the furnace coil changes to alter the capacity by phase difference control.

A further purpose is to correct the power factor of a circuit by progressive automatic insertion or removal of capacity or inductance.

A further purpose is, optionally to provide a leading current for a furnace coil and then to correct the unity power factor by step by step automatic introduction of a removal of reactance.

Further purposes will appear in the specification and in the claims.

In compliance with the statute I have illustrated one main form of apparatus by which my invention may be completely carried out but without thought or suggestion that this is the only apparatus for this purpose and with definite knowledge that other apparatus will serve the purpose. In order to show the general application of the invention to power factor correction I have illustrated in connection with this preferred form several among the many arrangements of corrective elements (capacity or inductance) by which correction can be secured. All of these and many not so shown can be substituted for the corrective capacity units of my preferred form and operated by the mechanism diagrammatically illustrated by me or by other mechanism carrying out my invention.

Figure 1 is a diagrammatic representation of a phase-displacement-operated corrective device for correcting the phase in a furnace. It omits the connections by which phase displacement is effective to produce mechanical movement.

Figures 1a and 1b are diagrammatic views showing the contacts of Figure 1 closed when leading and lagging displacement respectively have taken place.

Figure 2 is a fragmentary diagrammatic view of a conventional form of electrical connections and windings by which displacement causes movement of a movable needle.

Figure 3 is a detail view of the contact closure cam.

Figures 4—7 are fragmentary diagrammatic views of several corrective elements which may be inserted by my methods.

In the drawings similar numerals indicate like parts.

When melting magnetic material the reactance of the furnace changes quite seriously from the beginning of the melt to its end. Even with nickel silver, which is only partly magnetic, the reactance of the furnace may change a 70 per cent leading current at the beginning of the melt to a 70 per cent lagging current at the end of the melt. The change would be much more pronounced if the melt consisted of nickel iron. A rapid change takes place at the time the heat causes the charge to lose its magnetic properties.

If the material be heated in a furnace operated by an oscillator the change in the reactance requires no attention but when using a motor generator set, for example, the change in the reactance must be taken care of so that the power factor of the generator will at all times be maintained.

Where a number of furnaces are operated with current from a single generator it has been possible with a little care in timing the furnace operations to use each furnace to assist in maintaining uniformity of power factor in the group, but even then the power factor runs quite low at times and equipment must be provided to take care of these extremes, involving additional overhead expense in addition to the cost and risk of attempted manual control.

These expenses and risk are eliminated by my invention which makes the adjustments automatically and keeps the power factor within any desired approximation to unity.

The directive or selective apparatus which both sets the correcting apparatus in motion and determines in which direction it shall correct may comprise any form of connections suitable for operation of the needle of a phase meter in response to the leading or the lagging of a current with respect to its electromotive force. Of these the operating mechanism of a power factor meter, a volt-ammeter or a two circuit dynamometer having its movable circuit across the line and its fixed coils traversed by line currents will serve as examples. It will be obvious that my use does not require a scale nor the accuracy of movement ordinarily expected of a meter.

The indicating needle in the phase meter becomes a selector or director by which to determine which of two contacts is to be made. The instrument accordingly requires no greater delicacy than that, within the limits of permissible departure from unity power factor in the furnace circuit, it shall be swung to a position where it will make contact or will determine that contact shall be made to correct the phase displacement which caused the movement of the selector.

Where for convenience of language I speak of a phase meter or power factor meter it is to be understood that I refer to a mechanism by which a selector or director or contact maker responds to the leading or lagging character of a current to direct the correction required by the phase displacement.

In the particular embodiment shown in Figures 1–3, I have applied the circuits of a very desirable form of phase meter, a conventional single phase power factor meter to operate a contactor to insert capacity units in parallel across a furnace circuit or to withdraw these capacity units as required.

Describing in explanation and not in limitation:—

In Figure 1 I show a conventional power factor meter omitting the phase-responsive connections and showing the selector element 5 only, corresponding to the needle of the power factor meter. Conventional connections appear in Figure 2 where the current coils 6 and 7 are fed from the secondary 8 of a current transformer about the furnace circuit and the potential coils 9 and 10 are fed through reactance 11 and resistance 12 from the secondary 13 of a potential transformer, thrown across furnace supply leads 14, 15 extending from the generator, not shown, to the furnace coil 16 and to the capacity 17 by which part of the reactance of the furnace coil is compensated.

The needle 5, as explained, may be responsive to any other phase control and may even have a different character of movement provided it controls the insertion or removal of units capable of correcting the phase and bringing the movable element again to the position which has been selected as its neutral position.

Evidently the character of controller can be greatly varied. In the one shown, intended to cooperate with a swinging needle, movable contacts 18 and 19 pivoted at 18', 19' are adapted to lie normally below fixed contacts 20 and 21. A plunger 22 is lifted at frequent intervals—in practice preferably many times a minute—by a cam 23 upon a shaft 24 rotated by motor 25. The motor is supplied by any suitable source of current here indicated as alternating. The plunger is guided at 26 to move between the full and dotted positions shown.

In the neutral zone or position the needle lies beneath the space 27 between the ends of contacts 18 and 19. When the needle is in this neutral zone raising the plunger from the dotted position to the full line position of Figure 1 merely lifts the needle as shown without engaging or requiring that the needle engage the contacts.

When the current in the furnace supply circuit 14, 15 is leading beyond the intended permissible limit, the needle 5 moves to one side—let us say to the left as in Figure 1b—so as to lie beneath the contact 18. When the plunger is next raised by cam 23 the needle is no longer in position to be lifted within the space 27 but is pressed upwardly against and thus lifts the contact 18 causing it to engage the contact 20. Correspondingly, as shown in Figure 1a, if the current be lagging, raising of the plunger will cause the needle to be lifted against and hence to lift the movable contact 19 so that this movable contact 19 engages fixed contact 21.

In Figure 1, when the parts are in the positions shown in Figures 1a and 1b, circuits are closed from a source of current 28 through conductors 29, 29' and through one or other of oppositely wound fields 30, 30' of motor 31 to rotate the motor armature and any suitable gearing by which a distributor switch 32 is turned in opposite directions according to the field through which the current is passed.

Figure 1a position corresponds to a lagging current from the generator. The circuit is then closed (Figure 1) through conductor 33. Figure 1b corresponds to a leading current. The circuit is closed through conductors 34, 34', electro-magnet 35 (whose function will appear later) and conductor $34^2$. Each impulse through contacts 18 and 20 or through contacts 19 and 21 will, therefore, result in rotation of the motor armature but the impulse due to leading currents will be the only ones which energize electro-magnet 35.

For convenience of diagrammatic illustration I have shown belt and pulley gearing from the motor armature 31' using pulleys 36, 37, 36' and 37' connected by belts 38 and 38', to turnswitch-throwing arm 39 of switch 32. This successively operates switch levers 40, closing them in turn or opening them likewise one at a time. They engage with or disengage from contacts 41, whereby connections are made through conductors 42, 42', $42^2$, $42^3$, $42^4$, $42^5$, with individual electromagnets 43 or these connections are interrupted. These circuits are completed through conductors 44, 44' and a source of energy 45.

Four of the switches are shown as closed, causing flow of current through their respective electromagnets and consequent electromagnetic closure of switch levers 46 held normally open by springs 47. When these are closed connection is made through conductor 48 and condenser units here shown as sets of condensers 49.

Four of the sets of condensers are shown as closed. Clockwise rotation of the arm closes the corrective circuits and counter-clockwise rotation opens the circuits.

The several parallel circuits, containing capacity and controlled by power-factor-directed mechanism afford an effective automatic control of the power factor which is self-corrective and which operates step by step in the sense that the units are inserted and withdrawn one at a time. Any desired approach to uniform change of corrective capacity may be secured by adjustment of the number and size of the units.

Just as by showing series and parallel corrective units in Figures 4-7 I have no intention of suggesting that the correction must be by series or parallel connection as distinguished from the many series-parallel arrangements available, so also in showing a plurality of condensers in parallel in each unit in Figure 1 I have no intention of restricting in this particular as compared with condensers in series or in series parallel.

In Figure 4 adjustment of the power factor of the circuit is intended to be made by phase-operated control of circuits inserting or withdrawing series capacity shown as condensers 51'. Two only of a number of condenser units are shown. Normally each is short-circuited, as in the view, by a conductor $44^2$ and a switch 46' held to closed position by spring 49. As contrasted with the electromagnetic closing of the switches in Figure 1 there is here electromagnetic opening of the switches successively, step by step, or release of the switches from electromagnetic control, also step by step, until the needle of the phase meter used has come to neutral position. The electromagnets shown at 43 are of the same type as are shown in Figure 1 and may be connected with the same conductors 42$^x$ as in that figure with return circuits at 44 if desired. As will be seen, energization of the electromagnets one by one will bring the corresponding capacities into the circuit making it possible to use the entire operating mechanism of Figure 1 up to the electromagnets for operation of these magnets in Figure 4.

As compared with what is in effect a current transformer in Figure 1, where condensers are thrown across the circuit in parallel, the current within the furnace coil being greatly in excess of that supplied by the generator, the arrangement in Figure 4 forms in effect a voltage transformer, giving an available voltage across the furnace terminals in excess of that provided by the generator.

In Figure 5 I have provided additional capacity which may be thrown manually so as relatively to over-compensate the reactance of the furnace coil. The current at the generator may thus be made normally leading and unity power factor, or a desired approximation to it, may be secured by introducing reactances 50 in the circuit. Two only of these are shown among a larger number which would ordinarily be used in order to keep the amount of each change small. Each reactance is normally short-circuited as shown. As in Figure 4 and in Figure 1 the corrective devices are introduced step by step but the correction is by reactance instead of by capacity and, as compared with Figure 1 is effected by opening the circuit instead of by closing it.

With the same arrangement of fixed and varied capacities in Figure 6 as in Figure 5, I provide in Figure 6 for insertion of inductances 50′ by a construction which may be the same as in Figure 1 except that inductance is used instead of capacity. Here also I illustrate additional manually inserted capacity by which the circuit can be over compensated so that automatic induction of reactance will take place.

In Figure 7 I show a construction comparable with Figure 5 in that it induces or withdraws series reactance into or from the furnace circuit. Here a variometer 51 is inserted in one of the furnace leads 14 and the movable variometer coil is shifted in the proper direction to increase or reduce reactance as required. Here the electromagnetic switching devices of Figure 1 would not apply but the variometer may be shifted directly by connecting a link 52 from the movable coil to the movable contact member 39 viewed merely as a lever arm obviously the position of the variometer in the circuit shown may be varied to place the condensers between the furnace and variometer or beyond the variometer as preferred.

In the operating mechanism of Figure 1, a number of impulses through the appropriate coil of the distributor switch motor may be required before the switch moves sufficiently to insert or withdraw an additional unit, whether the unit be that of Figure 1 or of some other type, as in Figures 4, 5 or 6. However, from the nature of the variometer, the change of reactance will be more gradual than with insertion of definite units, a change being effected with each movement of the motor, but the operation will still be step by step intervals because at each movement the variometer will be shifted to an extent corresponding with the impulse given to its operating lever arm by the motor.

Whatever the character of the power factor correction, whether by insertion or removal of capacity or inductance and whether it be inserted or removed in series, in parallel or in any combination of these, or by any other means, I provide for automatic corrective operation set in motion by deviation in phase between the supplied current and electromotive force. The correction takes place after each departure of the needle from its mid position, here considered as corresponding to unity power factor, and results in inserting and continuing to insert or removing and continuing to remove corrective units at intervals of plunger operation until neutral power factor has been restored. For convenience I have regarded the mid position as corresponding to unity power factor but it may correspond to either leading or lagging current. A slightly leading power factor has been found to be desirable and the device may be constructed to secure this or adjusted by movement of the lower contacts to secure this.

I find that I can satisfactorily adjust the power factor with the insertion and withdrawal of a much smaller number of relatively larger units, simplifying the construction, if I reduce the voltage of the generator at the time condensers are withdrawn. This requires attention when the power factor is leading. I have shown one method and construction for accomplishing this in Figure 1 where a resistance 53 is thrown in series with an exciter coil 54 of the generator supplying the furnace at the time that the power factor correction is being made.

Normally this resistance is short-circuited by conductor 55 and spring-closed blade 56 of an electromagnetic switch. The switch blade is opened by electro-magnet 35 in circuit with fixed and movable contacts 57, 58 which are automatically closed at every rotation of the shaft 24 but whose closure does not become effective except when the circuit is completed by reason of the leading character of the current causing contact at 18, 20. This closing can be effected conveniently by cam 59 upon the same shaft 24 which carries cam 23, though this close and rigid connection between the operating parts is of course not necessary to secure proper timing.

The contact closure shown as cam 59 should operate slightly in advance of the alteration of the circuit and should remain in effect slightly longer than the time occupied by the change. I have indicated this diagrammatically by having the dwell 59' of the cam 59 angularly overlap the dwell 23' of cam 23 at each end of the cam.

The connections of the exciter circuit have been indicated at 60 though it has not been considered necessary to show the exciter applied to the motor generator nor the connection of the latter to the leads 14, 15. The exciter coil shown may furnish the entire excitation or a part only of the excitation.

In operation current is supplied from the generator leads 14 and 15 to the inductor coil 16 having reactance indicated at X and resistance indicated at R. If the power factor be variant from unity and so long as it is variant, the phase meter needle will lie at one side or the other of the central position according as capacities should be inserted or removed from the circuit. At the next upward movement of plunger 22 the corresponding contacts will be closed to rotate the distributor switch motor and to move the switch correspondingly in one direction or the other. This movement of the distributor switch will stop when the plunger 22 lowers, giving the needle 5 a chance to find a new position. If the correction effected by rotation of the distributor motor be insufficient, the needle 5 will remain at the side to which it has swung, for the next upward movement of the plunger and this operation of successive plunger movements and successive rotations of the motor 31 will continue until the needle 5 moves to approximately the center. It will then remain there until a further change in the power factor of the circuit causes the needle to swing to one side or the other again, when further correction takes place as required during the continuance of the melting or heating operation.

As the motor of the distributor switch rotates to the right, let us say, the switch arm travels progressively about its arc, closing the contacts and energizing electro-magnets 43 one at a time. In all of the figures except Figure 7 the steps will correspond with the size of the units of capacity or reactance in circuit while in Figure 7 they will correspond with the extent of each separate movement of the distributor motor.

It will be evident that my automatic power factor correction may be carried out in other ways than here illustrated and by many other means. It is my purpose therefore to include herein all such as come within the reasonable spirit and scope of my invention.

Having thus described my invention, what I claim as new and desire to secure by Letters Patent is:—

1. In a power factor corrective device, a load circuit having variable reactance, a source of current supply therefor, a phase-controlled needle connected with said source of current supply, corrective units of reactance adapted for inclusion in or exclusion from the circuit, a contactor making opposite contacts with leading or lagging position of the phase-controlled needle, circuits including said contacts and a distributor switch and connections controlled alternatively by said last named circuits to change the units in the load circuit in either direction.

2. In a device for power factor control of a source of supply for an induction furnace, a furnace inductor, capacity correcting the reactance of the inductor, additional capacity units for changing the capacity of the circuit with alteration of the reactance of the inductor, a distributor switch for making the changes in the capacity, a contact making device responsive to leading or lagging character of the supply current, means for operating this device at intervals to close different circuits, one for leading and the other for lagging character of current and means operated by one or other of the two circuits for moving the distributor switch to increase or reduce the number of capacity units in the furnace circuit.

3. A source of current supply, an inductor furnace coil adapted to operate upon a load of varying reactance, corrective capacity for said furnace capable of increase or reduction to meet the variations in reactance of the inductor caused by changes in the load and a capacity changing device responsive to the leading or lagging character of the current supplied to include or exclude capacity in or from the circuit to correct the power factor of the supply.

4. In a corrective device for maintaining power factor in an inductor coil furnace current supply, a needle moving in response to phase displacement, a contact making device rendered effective for operation by said needle, alternative circuits closed by the contact making device, a distributor switch moved in different directions according to the circuit energized, a furnace inductor coil, a supply current therefor, capacity across the inductor coil, a plurality of capacity units adapted for insertion in the furnace circuit by the distributor switch and electromagnetic switches for including or excluding said capacity units and controlled by the distributor switch.

5. In an induction electric furnace, an inductor coil, a motor generator current supply therefor, condensers across the coil, a plurality of condenser units adapted to be inserted one at a time across said coil, an electromagnetic switch for each condenser unit including it or allowing it to be excluded, a distributor switch adapted for insertion of the units, step by step, a motor operating said switch and having reverse windings therein to operate the motor in opposite directions, a needle controlled in leading or lagging position by the power factor of the current from the motor generator, contacts adapted to be closed in different positions of the needle, plunger operating means for closing said contacts and circuits respectively closed by the plunger and needle in different positions to pass current through said windings alternatively and move the switch in opposite directions.

6. In an induction electric furnace, an inductor coil, a motor generator current supply therefor, condensers across the coil, a plurality of condenser units adapted to be inserted one at a time across said coil, an electromagnetic switch for each condenser unit including it or allowing it to be excluded, a distributor switch adapted for insertion of the units, step by step, a motor operating said switch and having reverse windings therein to operate the motor in opposite directions, a needle controlled in leading or lagging position by the power factor of the current from the motor generator, contacts adapted to be closed in different positions of the needle, plunger operating means for closing said contacts, circuits respectively closed by the plunger and needle in different positions to pass current through said windings alternatively and move the switch in opposite directions, a normally open circuit including an electromagnet, means synchronizing with the movement of the plunger for closing said circuit and an exciter coil in the motor generator having its current altered by the energization or deënergization of the electromagnet.

7. In a device for correcting the power factor of a current supply for an inductive electric furnace, a source of current supply, a furnace inductor, corrective capacity for the reactance of said furnace inductor, in circuit with it and over-compensating or uncompensating for said reactance, reactance units adapted for insertion to compensate the inductor to bring the supply circuit to unity power factor and devices and connections responsive to difference in phase between the current and electromotive force of the source of supply for including or excluding the reactance units to automatically correct the power factor.

8. In a power factor corrective device, a load circuit, a source of current supply therefor, a variometer in said load circuit, a phase control needle connected with said source of current supply, capacity compensating the circuit, a contactor making contacts with leading or lagging position of the phase control needle, circuits including said contacts, and connections whereby the leading or lagging character of the load circuit is made to vary the position of the variometer.

9. In a power factor corrective device, a variometer, a circuit through said variometer, an induction furnace fed by said circuit, corrective units of capacity for compensating said circuit and phase-operated means for moving the variometer to increase or decrease the reactance thereof according to the character of the phase of the circuit.

EDWIN FITCH NORTHRUP.